United States Patent Office 2,992,887
Patented July 18, 1961

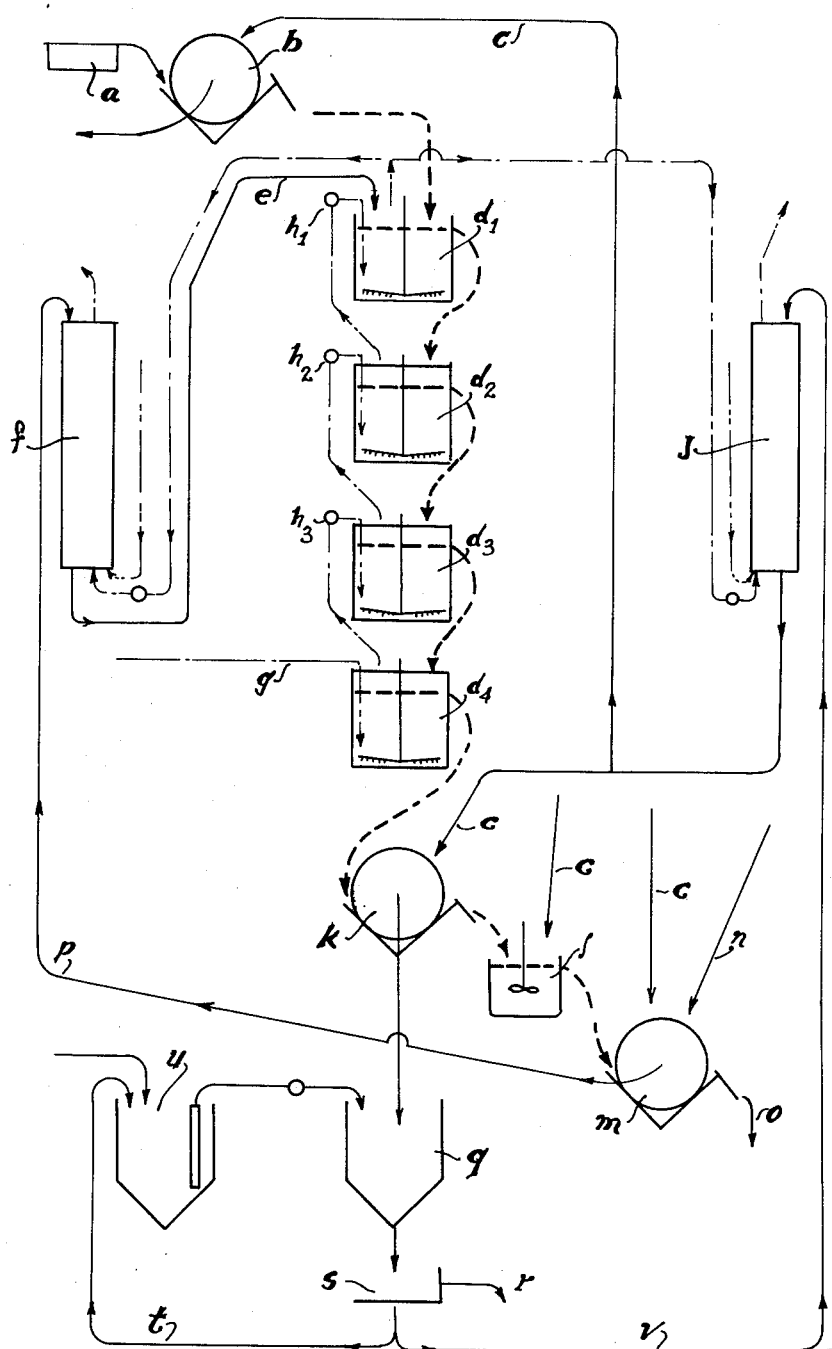

2,992,887
LEACHING OF URANIUM ORES USING ALKALINE CARBONATES AND BICARBONATES AT ATMOSPHERIC PRESSURE
Arvid Thunaes, Ernest Arthur Brown, Alfred Thomas Rabbitts, Roger Simard, and Harold J. Herbst, Ottawa, Canada, assignors, by mesne assignments, to the United States of America, as represented by the United States Atomic Energy Commission
Filed May 8, 1953, Ser. No. 353,753
Claims priority, application Canada Sept. 25, 1952
4 Claims. (Cl. 23—14.5)

This invention relates to a process for the extraction of uranium and more particularly to a process for leaching uranium from its ores or other uranium bearing materials with alkaline carbonate solutions.

If a uranium ore is leached with an alkaline carbonate solution only the hexavalent uranium will be extracted since the tetravalent uranium will be insoluble in such solutions. Furthermore, unless alkaline bicarbonate is present as well as alkaline carbonate, only part of the hexavalent uranium will be converted into a soluble compound. Hence it is necessary that the leaching solution contain an oxidizing agent to oxidize the tetravalent uranium and also alkaline bicarbonate to insure that substantially all of the uranium is dissolved by the leach solution.

Uranium commonly occurs in ores in the uranous state. Also the ore will commonly contain reducing agents, such as, for example, metallic iron introduced in grinding, which can reduce uranium from the hexavalent uranyl to the tetravalent or uranous state. If an effective oxidizing agent is used and the leach solution also contains alkaline bicarbonate soluble uranyl tricarbonate will be produced in accordance with reactions similar to the following equation (1) $UO_2 + O + Na_2CO_3 + 2NaHCO_3$
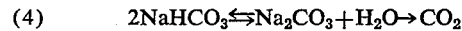
$\rightarrow Na_4UO_2(CO_3)_3 + H_2O$ If alkaline bicarbonate is lacking or insufficient in the leach solution only part of the hexavalent uranium is converted to the soluble uranyl tricarbonate. The remainder reacts to form uranate compounds which have low solubility. Under such conditions the reactions will proceed according to one or both of the following equations (2) $2UO_3 + 3Na_2CO_3 \rightarrow Na_4UO_2(CO_3)_3 + Na_2UO_4$ (3) $3UO_3 + 3Na_2CO_3 \rightarrow Na_4UO_2(CO_3)_3 + Na_2U_2O_7$ It will be apparent from the foregoing that it is insufficient for a high rate of extration that alkaline bicarbonate and an oxidizing agent be present initially. It is also important that these be present throughout the major portion of the leaching step.

If alkaline bicarbonate is added initially it will decompose during the leaching step with the consequence that there may be insufficient bicarbonate towards the end of the leaching step to convert all of the uranium to a soluble form. The rate of decomposition is increased where an elevated temperature such as 75° C. is employed. Air or gaseous oxygen affords a convenient and inexpensive method of oxidizing the ore but its use enhances the difficulty of maintaining the bicarbonate content as the gaseous oxidizing agent draws off carbon dioxide from the solution.

The difficulty cannot be overcome in a practical manner by increasing the initial concentration of bicarbonate as the rate of decomposition of the bicarbonate increases with its concentration and an impractically high initial concentration of bicarbonate would be required as is shown by Experiment 1.

*Experiment 1.*—A solution was made up to contain 79.25 grams of $NaHCO_3$ per litre and no $Na_2CO_3$. This is equivalent to 50 grams of $Na_2CO_3$ per litre according to the equation (4) $2NaHCO_3 \rightleftharpoons Na_2CO_3 + H_2O \rightarrow CO_2$ The solution was heated to 75° C. and kept at this temperature with constant stirring and was aerated continuously for 24 hours with ordinary air at a rate of 500 cc. air per minute per litre of solution.

Decomposition of the bicarbonate according to Equation 4 proceeded as follows

| Time (hrs.) | 0 | ½ | 3 | 6 | 12 | 18 | 24 |
|---|---|---|---|---|---|---|---|
| Percent decomp | 0 | 30.7 | 50.1 | 60.3 | 72.2 | 78.2 | 84.2 |

It is apparent that to provide a final alkaline bicarbonate concentration of 15 grams per litre after 24 hours even in the absence of consumption of the bicarbonate by reaction with the ore, it would be necessary to have an initial concentration of about 80 grams per litre.

The tendency for the bicarbonate to decompose can be suppressed by leaching the ore in pressure vessels. The use of such pressure vessels, however, substantially increases both the initial cost of the equipment and also the operating costs.

The object of the present invention is to provide a process in which uranium can be extracted with high efficiency by means of leaching with alkaline carbonate solutions without the necessity of operating under greater than atmospheric pressures.

In accordance with this invention in its broadest aspect the material containing uranium is treated with a leach solution containing alkaline carbonate and alkaline bicarbonate. During the leaching step a gas containing a gaseous oxidizing agent and carbon dioxide is passed through the leach solution. It has been found that the continuous supply of oxygen and carbon dioxide thereby provided is effective both to maintain oxidizing conditions during the leach and to sustain the bicarbonate content of the leach solution.

The beneficial effects of a process in accordance with this invention are most evident in the case of ores which are low in sulphur. Ores containing sulphur form bicarbonate during leaching through reactions of sulphide with carbonate such as (5) $2FeS_2 + 15O + 8Na_2CO_3 + 7H_2O$
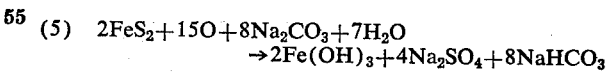
$\rightarrow 2Fe(OH)_3 + 4Na_2SO_4 + 8NaHCO_3$ As will subsequently be evident, even in the case of ores containing sulphur the recovery will be enhanced by the process of this invention.

The gas which is passed through the leach solution will ordinarily contain air and a small percentage of carbon dioxide. Air is for most purposes substantially as efficient as oxygen and is of course far less expensive. However, oxygen or other gases having oxidizing properties may be used. A small percentage of carbon dioxide in the neighbourhood of 1% to 2% will be sufficient when bicarbonate is initially present, in the pulp.

Approximate figures for the equilibrium of carbon dioxide and bicarbonate under conditions closely approximating those of the leaching are given below. With a total concentration of carbonate and bicarbonate equivalent in sodium concentration to 53 grams $Na_2CO_3$ per litre and at a temperature of 75° C. the equilibrium values are as shown in Table 1.

Table 1

| $NaHCO_3$, gm./l. | Equilibrium partial pressure of $CO_2$, mm. Hg | Equilibrium percent $CO_2$ in gas at atmospheric pressure |
|---|---|---|
| 5 | 0.22 | 0.03 |
| 10 | 0.93 | 0.12 |
| 15 | 2.23 | 0.29 |
| 20 | 4.29 | 0.56 |
| 25 | 7.27 | 0.96 |
| 30 | 11.4 | 1.5 | accordance with this invention it is not possible to define any fixed proportions or amounts of reagents nor any fixed temperature or flow of aerating gas as being those which will give the most efficient extraction in every case. However the practice best suited to a particular application can be determined readily by tests.

Comparative tests made with ores which are low in sulphur are illustrated in Table 2 and give a further indication of the advantages of this invention.

In the experiments which form the basis of Table 2 it will be noted that an excess of carbon dioxide was used. This was for convenience of experimentation. A lesser amount would be used in practice as has previously been indicated. It will be observed from an examination of Table 2 that with no bicarbonate present initially and no carbon dioxide added to the aerating gas (Test 1) only about half the uranium was extracted in 24 hours. Only a very small amount of bicarbonate was present in the leach liquor at 24 hours (this would be formed from the traces of sulphide in the ore and from small amounts of carbon dioxide introduced in agitation). The residue Table 2

| Test | 1 | 2 | 3 | 4 |
|---|---|---|---|---|
| Treatment of low sulphur ore $U_3O_8$ 0.4=0.5%, S traces. Leaching at 50% solids. | No bicarbonate present initially. No $CO_2$ added to aerating gas. | Bicarbonate present initially. No $CO_2$ added to aerating gas. | Bicarbonate present initially. $CO_2$ added to aerating gas. | Bicarbonate present initially. $CO_2$ added to aerating gas. |
| Initial conc.— | | | | |
| $Na_2CO_3$ gm./l. | 50 | 50 | 50 | 50. |
| $NaHCO_3$ gm./l. | Nil | 20 | 20 | 20. |
| Leach temp. | 50° C. | 75° C. | 75° C. | 85° C. |
| Aerating gas | Oxygen | Oxygen | Oxygen+10% $CO_2$ | Air+10% $CO_2$. |
| Residue assays: | | | | |
| 6 hrs | 0.22% $U_3O_8$ | 0.18% $U_3O_8$ | 0.21% $U_3O_8$ | 0.11% $U_3O_8$. |
| 12 hrs | 0.18% $U_3O_8$ | 0.15% $U_3O_8$ | 0.08% $U_3O_8$ | 0.074% $U_3O_8$. |
| 18 hrs | 0.21% $U_3O_8$ | 0.13% $U_3O_8$ | | 0.070% $U_3O_8$. |
| 24 hrs | 0.22% $U_3O_8$ | 0.14% $U_3O_8$ | 0.07% $U_3O_8$ | 0.068% $U_3O_8$. |
| 24 hr. leach liquor $NaHCO_3$ gm./l. | 1.7 | 6.9 | 46.6 [1] | 41.5. |

[1] At 48 hours—see text.

It will be evident that 1% $CO_2$ in the aerating gas will be ample to maintain a bicarbonate concentration of between 10 and 20 grams per litre which will be sufficient for efficient extraction. A suitable gas may be compounded without difficulty; for example, with a flue gas containing 10% $CO_2$, a mixture of 10% flue gas, 90% air would give an aerating gas containing 1% $CO_2$. Such an aerating gas would eventually build up an equilibrium bicarbonate concentration of about 25 grams per litre in a pure solution. In practice, where a pulp is being treated between 1 and 2% may be necessary.

The temperature required in leaching will ordinarily be in the range 50 to 100° C.

The flow of aerating gas required will ordinarily be in the range 0.25 to 1.0 cubic foot per minute per square foot of pulp surface area, and it should of course be dispersed in the pulp in as thorough a manner as is practical. An open ended pipe, for instance, is not satisfactory, since much of the aerating gas merely rises through the pulp without making adequate contact. Diffusers or mechanical gas dispersers should be used. The pulp density employed in leaching will depend largely upon what is most conveniently handled in equipment to be used. Leaching will be satisfactory at any pulp density that can be handled by ordinary thickeners or continuous filters.

The fineness to which the ore being treated should be ground will depend upon the particle size at which the uranium mineral is liberated, that is, made accessible to attack by the leach solution.

Due to natural variations in the character of individual ores and in the composition of other materials from which uranium may be extracted by the method of leaching in assay was 1½ times as high as the residue assay in 24 hours when bicarbonate was present initially (Test 2).

It will further be noted that in Test 2 no carbon dioxide was added to the aerating gas and that the initial bicarbonate concentration of 20 grams per litre dropped to 6.9 grams per litre in 24 hours. There was little further leaching of uranium after 6 hours.

In Test 3 bicarbonate was present initially in the same amount as in Test 2 and the presence of bicarbonate was maintained throughout leaching by adding $CO_2$ to the aerating gas. A marked improvement in the rate and the extent of uranium extraction resulted. Aeration of the pulp was continued in this test for another 24 hours and at the end of the 48 hour period the sodium bicarbonate concentration had been built up to 46.6 grams per litre by the action of the carbon dioxide in the aerating gas.

Test 4 showed that when air with added $CO_2$ was used as the aerating gas, extraction of uranium could be as efficient as when oxygen with added $CO_2$ was used.

In the case of ores which contain sulphides these sulphides will react with the carbonate to form bicarbonate under oxidizing conditions. The reaction will be similar to (6) $2FeS_2 + 15O + 8Na_2CO_3 + 7H_2O$
$\rightarrow 2Fe(OH)_3 + 4Na_2SO_4 + 8NaHCO_3$ In addition, other constituents of the ore may form bicarbonate in a like manner, for example, certain arsenates, phosphates, and sulphates.

Table 3 shows the results of experiments involving the leaching at atmospheric pressure of an ore containing sulphides.

*Table 3.—Ore containing sulphides, leached at atmospheric pressure*

| Test | 5 | 6 | 7 | 8 | 9 | 10 | 11 |
|---|---|---|---|---|---|---|---|
| Treatment of ore containing sulphides (ore 8/51-3). $U_3O_8$ 0.2-0.25%, S 0.4-0.5%. Leaching at 50% solids. | No bicarbonate present initially. No $CO_2$ added to aerating gas. No recycle of aerating gas. | Bicarbonate present initially. No $CO_2$ added to aerating gas. No recycle of aerating gas. | No bicarbonate present initially. Aerating gas contains $CO_2$ picked up by recycling. No other $CO_2$ added. | Bicarbonate present initially. No $CO_2$ added to aerating gas. No recycle of aerating gas. | Bicarbonate present initially. $CO_2$ added to aerating gas. No recycle of aerating gas. | Bicarbonate present initially. Aerating gas contains $CO_2$ picked up by recycling. No other $CO_2$ added. | No bicarbonate present initially. $CO_2$ added to aerating gas. No recycle of aerating gas. |
| Initial conc.: | | | | | | | |
| $Na_2CO_3$ gm./l. | 50 | 50 | 50 | 50 | 50 | 40.9 | 50. |
| $NaHCO_3$ gm./l. | nil | 20 | nil | 20 | 20 | 14.4 | nil. |
| Leach temp. | 75° C | 75° C | 75° C | 75° C | 75° C | 75° C | 75° C. |
| Aerating gas | Oxygen | Oxygen | Oxygen | Air | Air+2.5% $CO_2$ | Oxygen | Nitrogen+2.5% $CO_2$. |
| Gas ratio [1] | 0.6 | 0.6 | 0.25 | 1.3 | 1.5 | 0.5 | 1.5. |
| Residue assays: | | | | | | | |
| 6 hrs. | 0.10% $U_3O_8$ | 0.058% $U_3O_8$ | 0.066% $U_3O_8$ | 0.074% $U_3O_8$ | 0.058% $U_3O_8$ | 0.061% $U_3O_8$ | |
| 12 hrs. | 0.053% $U_3O_8$ | 0.031% $U_3O_8$ | 0.032% $U_3O_8$ | 0.045% $U_3O_8$ | 0.036% $U_3O_8$ | 0.028% $U_3O_8$ | |
| 18 hrs. | 0.036% $U_3O_8$ | 0.021% $U_3O_8$ | 0.020% $U_3O_8$ | | 0.024% $U_3O_8$ | 0.019% $U_3O_8$ | |
| 20 hrs. | | | 0.018% $U_3O_8$ | | | | 16 hr. 0.14% $U_3O_8$. |
| 24 hrs. | 0.022% $U_3O_8$ | 0.021% $U_3O_8$ | | 0.034% $U_3O_8$ | 0.017% $U_3O_8$ | 0.017% $U_3O_8$ | 0.12% $U_3O_8$. |
| Final leach liquor, $NaHCO_3$, gm./l. | 5.7 | 11.5 | 14.5 | | | 29.2 | 40.3. |
| Final percent $CO_2$ in recycled gas. | | | 1.0% | | | 3% | |

[1] Volume of gas flow per minute per volume pulp.

If Tests 5 and 6 of Table 3 are examined it will be observed that even though the ore contained sulphides it was advantageous for bicarbonate to be present initially. Similarly a comparison of Tests 8 and 9 show that the efficiency of uranium extraction is improved by the addition of carbon dioxide to the air.

Of particular interest is a comparison of the results of Tests 6 and 8 which shows that where bicarbonate was present initially but no carbon dioxide was added to the aerating gas, the extraction of uranium was decidedly better with oxygen as the aerating gas than with air. This was mainly due to a slower reaction of sulphides when air was used, consequently decomposition of bicarbonate by loss of carbon dioxide was not counteracted to the same extent as with oxygen. On the other hand where air with added carbon dioxide was used as in Test 9 the extraction was as efficient as when using oxygen with added carbon dioxide. (Tests 7 and 10.) The important result is that the present invention enables inexpensive and readily available air to be used in place of oxygen with these ores.

It will be observed that good extraction was obtained in Test 7 where no bicarbonate was present initially, but where recycled oxygen was used as the aerating gas, this recirculation returned any carbon dioxide which had been formed by the reaction of the sulphides with the carbonate and had been extracted in aerating the ore pulp. The oxygen thus became an aerating gas containing $CO_2$, without the $CO_2$ having been added from an external source. This enabled the sulphide reaction to build up the bicarbonate concentration from zero initially to 14.5 grams per litre in the final leach liquor. The extraction was not significantly better in other tests where the bicarbonate concentration was higher.

There was no advantage in having bicarbonate present initially when recycled oxygen was used as the aerating gas (Test 10). With the higher overall bicarbonate concentration which resulted, there was no further improvement in rate or extent of extraction.

Using oxygen with recycling and without the initial presence of bicarbonate, uranium was ultimately extracted to the same extent, but in a longer time. Recycling provided carbon dioxide in the aerating gas and built up bicarbonate more rapidly in the leach solution and to a higher concentration, resulting in a higher rate of extraction.

Table 3 shows that, in the treatment of the ore containing sulphides, the extraction was most efficient under the following combinations of conditions, all of which gave substantially equivalent results:

(a) Bicarbonate present initially, oxygen as aerating gas with no added $CO_2$ and no recycle.
(b) No bicarbonate initially, oxygen as aerating gas containing $CO_2$ due only to recycling.
(c) Bicarbonate present initially, air with added $CO_2$ as aerating gas and no recycle.

The last combination of conditions also gave optimum extraction from the low sulphide ore (Table 2, Test 4). It will be evident from the examples which have been given that the first two combinations of conditions (a) and (b), would be less effective than the last, (c), in the case of an ore which did not contain sulphides or other constituents capable of reacting to form bicarbonate.

The use of oxygen as the aerating gas will normally be out of the question when air can be used instead, and the application of the leaching operation in practice will be discussed on that basis.

Test 11 has been included merely as confirmation that the aerating gas had to have oxidizing properties. Nitrogen plus added $CO_2$ provided sufficient bicarbonate, but extraction was poor since an oxidizing condition was not maintained.

The manner in which this invention may be practised is evident from the drawing in which the flow sheet shows the leaching of a sulphide ore in a system in which the air travels countercurrent to the leach pulp.

The flow sheet shows the manner in which leaching at atmospheric pressure in accordance with this invention can be combined with conventional methods and procedures to give a complete process for the extraction of uranium and the production of a uranium concentrate. The requisite steps are as follows:

The ore is ground in a conventional closed circuit to suitable fineness. The grinding means is designated in the flowsheet as *a*. The slurry of ground ore is filtered in filter *b*, the filter cake being washed by a displacement wash *c* consisting of barren leach solution which has been carbonated to convert excess caustic to normal carbonate (for purpose of illustration it is assumed that the uranium will be precipitated from the leach liquor by the known method of adding caustic soda).

The filter cake is fed successively to agitators $d_1$, $d_2$, $d_3$ and $d_4$, where it is diluted to about 50% solids by wash filtrate $e$ from scrubber and carbonating tower $f$. In the case of a sulphide ore, air $g$ with no added carbon dioxide is introduced into the pulp in agitator $d_4$ and the pulp is maintained at a temperature of about 75° C. In aerating the pulp carbon dioxide is picked up from decomposition of the bicarbonate which has been formed by sulphide reaction. The agitators are of such a size that extraction has been accomplished in agitators $d_1$, $d_2$, $d_3$. Hence it is no longer necessary to maintain the bicarbonate. A reduction in bicarbonate concentration at this point is actually of benefit to the subsequent precipitation step. In caustic precipitation of uranium from carbonate solutions, any bicarbonate present consumes alkali hydroxide. The reduction in bicarbonate concentration achieved in agitator $d_4$ thus gives a saving in reagent consumption. The air which has passed through agitator $d_4$ and picked up a percentage of $CO_2$ is withdrawn from the agitator at a rate corresponding to the rate at which it enters so that the interior of the agitator remains at atmospheric pressure. An air pump or blower $h_3$ passes the air charged with $CO_2$ through agitator $d_3$, aerating the pulp and forming additional bicarbonate by oxidizing sulphides. Similarly air which has passed through $d_3$ is pumped through $d_2$ by pump $h_2$, and through agitator $d_1$ by pump $h_1$. The air issuing from agitator $d_1$ passes to scrubbers $f$ and/or J, after which it may be discarded or stored as a source of carbon dioxide. In scrubber J the carbon dioxide may be used in the neutralization of free caustic in the barren solution being recirculated from precipitation. If the carbon dioxide content is deficient, part of the aerating gas may be passed through another scrubber to add bicarbonate to the recycled wash filtrate being returned to leaching.

Depending on the sulphide content of the ore, it may be necessary to use some other source of $CO_2$ to add bicarbonate to the recycled wash filtrate, or it may be unnecessary to add any bicarbonate to the recycled wash filtrate if the sulphide content is sufficiently high.

The same countercurrent arrangement of the leaching step flowsheet may be used for ores which do not contain sulphides, merely by adding $CO_2$ to the aerating gas $g$ entering agitator $d_4$. Alternatively it may be added to agitator $d_3$. The operation would then be as follows.

The necessary bicarbonate may be added to the wash filtrate being recirculated to the leaching step, by the known method of passing this solution through a scrubber (carbonating tower) countercurrent to a flow of gas containing $CO_2$, for instance flue gas. Some of the sodium carbonate in the recycled wash filtrate is thereby converted to bicarbonate.

Any carbonate consumed in the process as a whole is then made up by adding enough $Na_2CO_3$ at this point to bring the solution up to the strength required for leaching. (A total concentration of carbonate and bicarbonate equivalent in sodium content to 50 grams $Na_2CO_3$ per litre will frequently be suitable, but may be lower or higher depending on the material being treated.)

The recirculated wash filtrate now containing the required carbonate and bicarbonate is mixed with the leach feed in agitator $d_1$. The presence of bicarbonate will be maintained throughout the leaching step owing to the fact that $CO_2$ is added to the aerating gas entering agitator $d_4$, and uranium will be extracted efficiently.

As has been shown, it is not necessary to add much carbon dioxide to the aerating gas in order to maintain a suitable bicarbonate concentration. 1 to 2% should be ample.

In accordance with the flowsheet the agitator $d_4$ discharges to filter K, where the solids are washed with a replacement wash of barren solution C from scrubber J. The solids are repulped in repulper L with additional barren solution $c$, filtered in filter M with barren solution and given a final wash with water N. The residue O goes to waste. The wash filtrate P is passed to scrubber $f$ and subsequently is added as $e$ to agitator $d_1$.

The leach liquor from filter K is precipitated in precipitation tank Q by the known procedure of adding caustic soda to form a high grade insoluble uranate compound $R_1$ after filtration in filter S. Part of the barren solution T from filter S is used to provide caustic for the next cycle by treatment with lime in tank U. The causticized barren solution is clarified to remove insoluble solids and returned to tank Q. It is not, however, contemplated that this invention be limited to the particular method of precipitation described. Other appropriate methods may be used.

The remainder of the barren solution V is directed to scrubber J where free caustic is destroyed by gassing with carbon dioxide bearing gas. As has already been described, part of the recarbonated barren solution is used as a replacement wash on filter $b$, and part is employed for filter K, repulper L and filter M.

It will be evident from the foregoing that this invention provides a convenient and inexpensive method for extracting uranium both efficiently and economically. The present invention enables leaching to be carried out at atmospheric pressures, that is to say under conditions in which the gas phase which occupies the leaching vessels above the surface of the slurry in the vessels is at a total pressure substantially the same as the prevailing atmospheric pressure. It will be realized however that that the use of an aerating gas containing carbon dioxide may also be beneficial when leaching is carried out at other pressures.

The embodiments of the invention in which an exclusive property or privilege is claimed are defined as follows.

We claim:

1. A method of leaching materials containing uranium compounds comprising leaching the material with a solution containing alkaline carbonate and alkaline bicarbonate, and bringing a mixture of a gaseous oxidizing agent and a substantially additional quantity of carbon dioxide into intimate contact with said solution during the leaching the carbon dioxide being present in the gas mixture in the amount of about 1 to 2%.

2. A method of leaching uranium ores containing sulphides comprising adding a leach solution containing alkaline carbonate and alkaline bicarbonate to the ore to form a slurry, passing the slurry through a series of agitators, passing an oxygen containing gas through the slurry in the last agitator in the series, passing the same gas enriched with carbon dioxide formed by the decomposition of bicarbonates in the slurry through the penultimate agitator and in the same manner passing the same gas increasingly enriched with carbon dioxide through the other agitators in the series, the conditions of agitation being such that the extraction of the uranium content will be substantially complete before the slurry reaches the last agitator.

3. A method of leaching uranium ores low in sulphides comprising adding a leach solution containing alkaline carbonate and alkaline bicarbonate to the ore to form a slurry, passing the slurry through a series of agitators, passing carbon dioxide enriched oxygen containing gas through the slurry in the last agitator in the series, passing the same gas enriched with carbon dioxide formed by the decomposition of bircarbonates in the slurry, through the penultimate agitator and in the same manner passing the same gas enriched with carbon dioxide through the other agitators in the series, the conditions of agitation being such that the extraction of the uranium content will be substantially complete before the slurry leaves the last agitator.

4. A method of leaching materials containing uranium values, at least a substantial proportion of the uranium of which is in the tetravalent state comprising the steps of leaching the material with a solution containing alkaline carbonate and alkaline bicarbonate and bringing a gas containing free oxygen and carbon dioxide into intimate contact with the solution during the leaching, said alkaline carbonate and alkaline bicarbonate and free oxygen being present in amounts sufficient to form soluble, uranyl tricarbonates with the uranium values present, and said carbon dioxide being present in said gas in an amount sufficient to maintain a bicarbonate concentration of at least 10 grams per litre during the leaching step until extraction is substantially complete.

References Cited in the file of this patent

UNITED STATES PATENTS 2,597,504   Larsson _____ May 20, 1952

OTHER REFERENCES

Roscoe et al.: Treatise on Chemistry, 4th ed., vol. I, pages 600–603 (1911). Published by Macmillan & Co., London.